(12) United States Patent
Zhao et al.

(10) Patent No.: US 7,115,247 B2
(45) Date of Patent: Oct. 3, 2006

(54) HYDROGEN STORAGE COMPOSITIONS AND METHODS OF MANUFACTURE THEREOF

(75) Inventors: Ji-Cheng Zhao, Latham, NY (US); John Patrick Lemmon, Schoharie, NY (US)

(73) Assignee: General Electric Company, Niskayuna, NY (US)

( * ) Notice: Subject to any disclaimer, the term of this patent is extended or adjusted under 35 U.S.C. 154(b) by 369 days.

(21) Appl. No.: 10/675,402

(22) Filed: Sep. 30, 2003

(65) Prior Publication Data

US 2005/0069490 A1 Mar. 31, 2005

(51) Int. Cl.
*C01B 3/04* (2006.01)
(52) U.S. Cl. .................................. 423/658.2
(58) Field of Classification Search ............ None
See application file for complete search history.

(56) References Cited

U.S. PATENT DOCUMENTS

| | | | | |
|---|---|---|---|---|
| 4,308,248 A | * | 12/1981 | Anderson | 423/579 |
| 5,015,305 A | | 5/1991 | Froes et al. | 148/670 |
| 5,067,988 A | | 11/1991 | Froes et al. | 419/31 |
| 5,133,929 A | | 7/1992 | Bogdanovic et al. | 420/441 |
| 5,215,710 A | | 6/1993 | Bogdanovic et al. | 420/400 |
| 6,030,724 A | * | 2/2000 | Sawa et al. | 429/218.2 |
| 6,106,801 A | | 8/2000 | Bogdanovic et al. | 423/648.1 |
| 6,887,511 B1 | * | 5/2005 | Shima et al. | 427/58 |
| 2003/0053948 A1 | | 3/2003 | Bogdanovic et al. | 423/658.2 |
| 2003/0099595 A1 | | 5/2003 | Yebka et al. | 423/658.2 |
| 2003/0129126 A1 | * | 7/2003 | Chen et al. | 423/645 |
| 2003/0175201 A1 | * | 9/2003 | Klett et al. | 423/448 |
| 2004/0009121 A1 | * | 1/2004 | Jensen et al. | 423/648.1 |
| 2005/0047994 A1 | * | 3/2005 | Meisner et al. | 423/658.2 |

OTHER PUBLICATIONS

Dougherty, D. and P.J. Herley, "Photolytic Decomposition of Sodium Tetrahydroaluminate Powder", J. Phys. Chem. 1982, 86, 4161-4164.

Jaramillo, Thomas F. et al., "High Throughput Screening System for Catalytic Hydrogen-Producing Materials", J. Comb. Chem. 2002, 4, 17-22.

* cited by examiner

*Primary Examiner*—Colleen P. Cooke
*Assistant Examiner*—Paul Wartalowicz
(74) *Attorney, Agent, or Firm*—Shawn A. McClintic; William E. Powell, III (57) ABSTRACT

Disclosed herein is a method for making and screening a combinatorial library, comprising disposing on a substrate comprising aluminum at least one reactant comprising lithium, germanium, magnesium, or a combination comprising at least one of the foregoing; heat treating the substrate to create a diffusion multiple having at least one phase; contacting the diffusion multiple with hydrogen; detecting any absorption of hydrogen; and/or detecting any desorption of hydrogen.

4 Claims, 5 Drawing Sheets

Aluminum

HYDROGEN STORAGE COMPOSITIONS AND METHODS OF MANUFACTURE THEREOF

BACKGROUND

This disclosure is related to hydrogen storage compositions and methods of manufacture thereof.

Hydrogen is a "clean fuel" because it can be reacted with oxygen in hydrogen-consuming devices, such as a fuel cell or a combustion engine, to produce energy and water. Virtually no other reaction byproducts are produced in the exhaust. As a result, the use of hydrogen as a fuel effectively solves many environmental problems associated with the use of petroleum based fuels. Safe and efficient storage of hydrogen gas is, however, essential for many applications that can use hydrogen. In particular, minimizing volume and weight of the hydrogen storage systems are important factors in mobile applications.

Several methods of storing hydrogen are currently used but these are either inadequate or impractical for widespread mobile consumer applications. For example, hydrogen can be stored in liquid form at very low temperatures. However, the energy consumed in liquefying hydrogen gas is about 40% of the energy available from the resulting hydrogen. In addition, a standard tank filled with liquid hydrogen will become empty in about a week through evaporation; thus dormancy is also a problem. These factors make liquid hydrogen impractical for most consumer applications.

An alternative is to store hydrogen under high pressure in cylinders. However, a 100 pound steel cylinder can only store about one pound of hydrogen at about 2200 psi, which translates into 1% by weight of hydrogen storage. More expensive composite cylinders with special compressors can store hydrogen at higher pressures of about 4,500 psi to achieve a more favorable storage ratio of about 4% by weight. Although even higher pressures are possible, safety factors and the high amount of energy consumed in achieving such high pressures have compelled a search for alternative hydrogen storage technologies that are both safe and efficient.

In view of the above, there is a need for safer, more effective methods of storing and recovering hydrogen. In addition, there is a desire to minimize the overall system volume and weight.

BRIEF DESCRIPTION OF THE INVENTION

Disclosed herein is a method for making and screening a combinatorial library, comprising disposing on a substrate comprising aluminum at least one reactant comprising lithium, germanium, magnesium, or a combination comprising at least one of the foregoing; heat treating the substrate to create a diffusion multiple having at least two phases; contacting the diffusion multiple with hydrogen; detecting any absorption of hydrogen; and/or detecting any desorption of hydrogen.

Disclosed herein too is a method of recovering hydrogen comprising contacting at least one compound of a diffusion multiple in hydrogen to form a hydrogenated compound, wherein the compound comprises AlLi, $Al_2Li_3$, $Al_4Li_9$, $Al_3Mg_2$, $Al_{12}Mg_{17}$, $AlB_{12}$, $Ge_4K$, GeK, $GeK_3$, $GeLi_3$, $Ge_5Li_{22}$, $Mg_2Ge$, $Ge_4Na$, GeNa, $GeNa_3$, aluminum doped $Ge_4K$, aluminum doped GeK, aluminum doped $GeK_3$, aluminum doped $GeLi_3$, aluminum doped $Ge_5Li_{22}$, aluminum doped $Mg_2Ge$, aluminum doped $Ge_4Na$, aluminum doped GeNa, aluminum doped $GeNa_3$, or a combination comprising at least one of the foregoing compounds; and heating the hydrogenated compound to recover the hydrogen.

Disclosed herein too is a compound of a diffusion multiple having the formula (II) or the formula (III)

where Li is lithium, Na is sodium, Mg is magnesium, K is potassium, Ca is calcium, Ge is germanium, Al is aluminum; a, b, c, d, e and f may be the same or different and have values from 0 to 1; x and y have values of 1 to 22; wherein at least one phase of the diffusion multiple absorbs hydrogen.

Disclosed herein too is a composition comprising a hydride of a compound, wherein the compound is AlLi, $Al_2Li_3$, $Al_4Li_9$, $Al_3Mg_2$, $Al_{12}Mg_{17}$, $AlB_{12}$, $Ge_4K$, GeK, $GeK_3$, $GeLi_3$, $Ge_5Li_{22}$, $Mg_2Ge$, $Ge_4Na$, GeNa, $GeNa_3$, aluminum doped $Ge_4K$, aluminum doped GeK, aluminum doped $GeK_3$, aluminum doped $GeLi_3$, aluminum doped $Ge_5Li_{22}$, aluminum doped $Mg_2Ge$, aluminum doped $Ge_4Na$, aluminum doped GeNa, aluminum doped $GeNa_3$, or a combination comprising at least one of the compounds.

DETAILED DESCRIPTION OF PREFERRED EMBODIMENTS

Disclosed herein is a method for developing a combinatorial library to determine aluminides and germanides (germanium-containing compounds) that may be advantageously used for the storage of hydrogen. Disclosed herein too are methods for manufacturing aluminides and germanides that can be subsequently hydrogenated to efficiently store hydrogen. Disclosed herein too are compositions comprising aluminides and germanides that can store hydrogen for use in the generation of energy in fuel cell applications for automobiles, homes and apartments, manufacturing industries, and the like. The aforementioned method for developing a combinatorial library to determine aluminides and germanides that may be used for the storage of hydrogen advantageously permits the simultaneous large scale testing of a wide variety of materials. This high efficiency methodology facilitates the creation of large controlled compositional variations and compounds in bulk samples for fast and systematic surveys of hydrogen storage properties of the aluminides and germanides.

Complex hydrides from which hydrogen can be obtained generally consist of a H—M complex, where M is a metal and H is hydrogen. Such hydrides may have ionic, covalent, metallic bonding or bonding comprising a combination of at least one of the foregoing types of bonding. These hydrides preferably have a hydrogen to metal ratio of greater than or equal to about 1. The reaction between a metal and hydrogen to form a hydride is generally a reversible reaction and takes place according to the following equation (I):

$$M+(x/2)H_2 \leftrightarrow MHx \qquad (I)$$

Complex hydrides can store up to about 18 weight percent (wt %) of hydrogen, and have high volumetric storage densities. The volumetric storage density of hydrides is greater than either liquid or solid hydrogen, which makes them very useful in energy storage applications. The process of hydrogen adsorption, absorption or chemisorption results in hydrogen storage and is hereinafter referred to as absorption, while the process of desorption results in the release of hydrogen.

In an exemplary embodiment, compositions comprising light metal aluminides and germanides can form hydrides that may be reversibly decomposed at relatively low temperatures of less than or equal to about 300° C. to release hydrogen. The light metals are lithium, sodium, magnesium, potassium, calcium, aluminum, and germanium. The light metal aluminides have the formula (II) while the light metal germanides have formula (III)

$$(Li_a, Na_b, Mg_c, K_d, Ca_e, Ge_f)_x(Al)_y \qquad (II)$$

$$(Li_a, Na_b, Mg_c, K_d, Ca_e, Al_f)_x(Ge)_y \qquad (III)$$

where Li is lithium, Na is sodium, Mg is magnesium, K is potassium, Ca is calcium, Ge is germanium, Al is aluminum; a, b, c, d, e and f may be the same or different and have values from 0 to 1; x , and y have values of 1 to 22. The sum of a+b+c+d+e+f is preferably equal to 1.

In one embodiment, a method of developing a combinatorial library for determining the hydrogen storage capabilities of an aluminide or germanide is via the use of a diffusion multiple. A diffusion multiple is a product of an interdiffusion reaction formed between a first reactant and a second reactant, when both reactants are placed in closed proximity with each other and heated to a temperature effective to permit interdiffusion to take place. The temperature effective to permit the interdiffusion is one that can overcome the activation energy of diffusion and achieve at least a degree of interdiffusion of the reactants within a manageable time. Such a temperature is generally about 200 to about 2000° C., depending upon the reactants.

Diffusion multiples are generally manufactured or prepared by placing reactants in a substrate to form a diffusion multiple assembly; optionally subjecting the diffusion multiple assembly to hot isostatic pressing; heat treating the diffusion multiple assembly to promote interdiffusion of the reactants with one another and/or interdiffusion between the reactants with the substrate; optionally cutting, polishing and grinding the diffusion multiple; identifying the elemental composition of the various phases present in the diffusion multiple; and charging the diffusion multiple with hydrogen by contacting it in a hydrogen rich gaseous mixture and determining the phases that absorb hydrogen.

Figure 1:
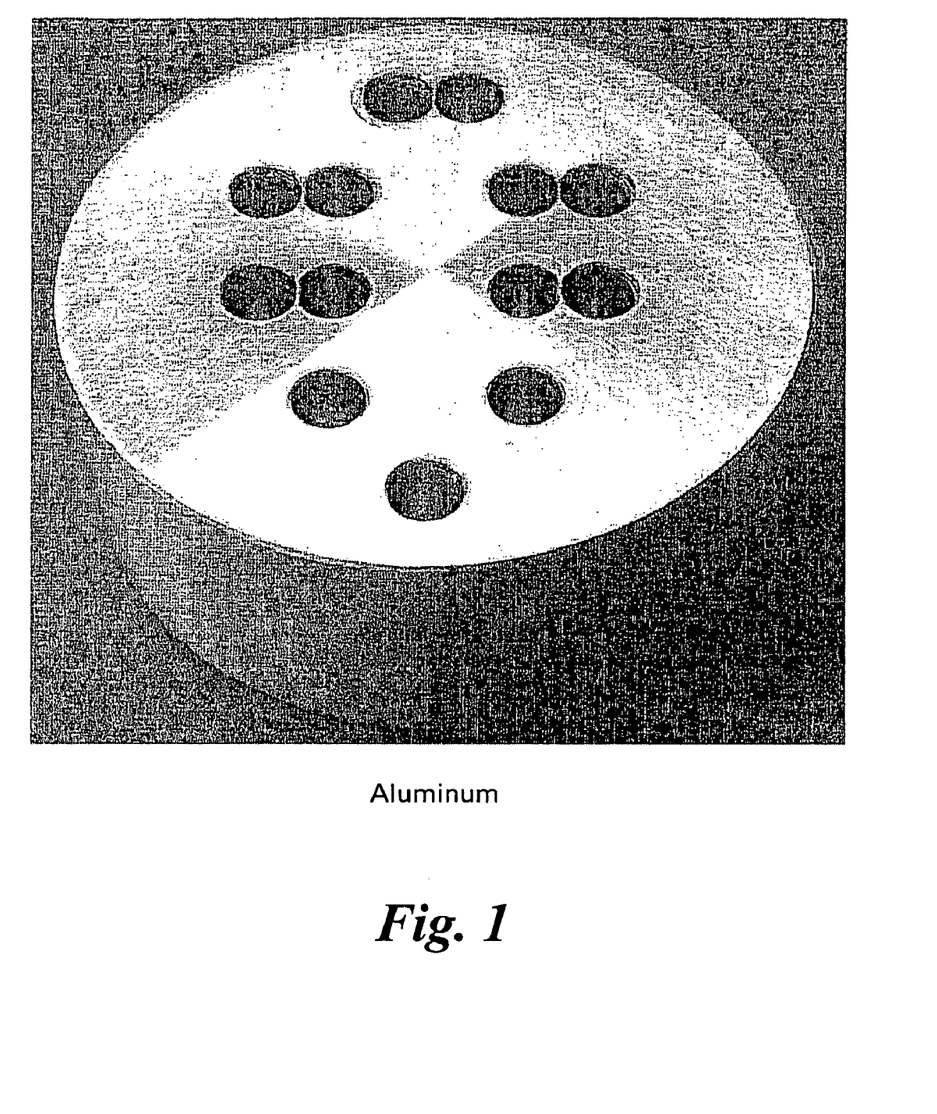
FIG. 1 is a photograph depicting the aluminum substrate used in the preparation of the diffusion multiple.

In one exemplary method of making a diffusion multiple assembly comprising light metal aluminides, the diffusion multiple is prepared by drilling holes into an aluminum block/substrate as shown in FIG. 1. These holes generally end half-way through the thickness of the block. Some holes are spaced apart from one another such that during the heat treatment, there is only one reactant reacting with the aluminum substrate to form binary compounds and binary solid solutions. The reactant may comprise a single element or a multiplicity of elements. Other holes are spaced in close proximity in pairs with each other as shown in the FIG. 1. This arrangement, i.e., where the holes are spaced in close proximity in pairs may be used to generate ternary diffusion triples (also termed ternary compounds and/or ternary solid solutions) upon subjecting the diffusion multiple assembly to heat treatment. The reactants are generally placed into the holes in a loose form i.e., they do not need to be a tight fit.

When the substrate comprises a single element, the number of holes drilled in the substrate is generally equal to the minimum number of diffusion multiples desired. Thus for example, if a binary diffusion couple is desired, one hole is drilled into the substrate, while if a ternary diffusion triple is desired, two holes are drilled into the substrate in close proximity to one another. The holes are about 1 to about 10 millimeters in diameter. The preferred diameter is about 5 millimeter. The thickness of the substrate is generally about 5 to about 25 millimeters in diameter. The preferred thickness of the substrate is about 25 millimeters.

The distance between the holes in the substrate is maintained as close as possible for those drilled in pairs. The distance d is generally about 0.1 to about 2000 micrometers. Within this range, it is generally desirable to utilize the distance to be less than or equal to about 400, preferably less than or equal to about 200, and more preferably less than or equal to about 100 micrometers.

Figure 2:
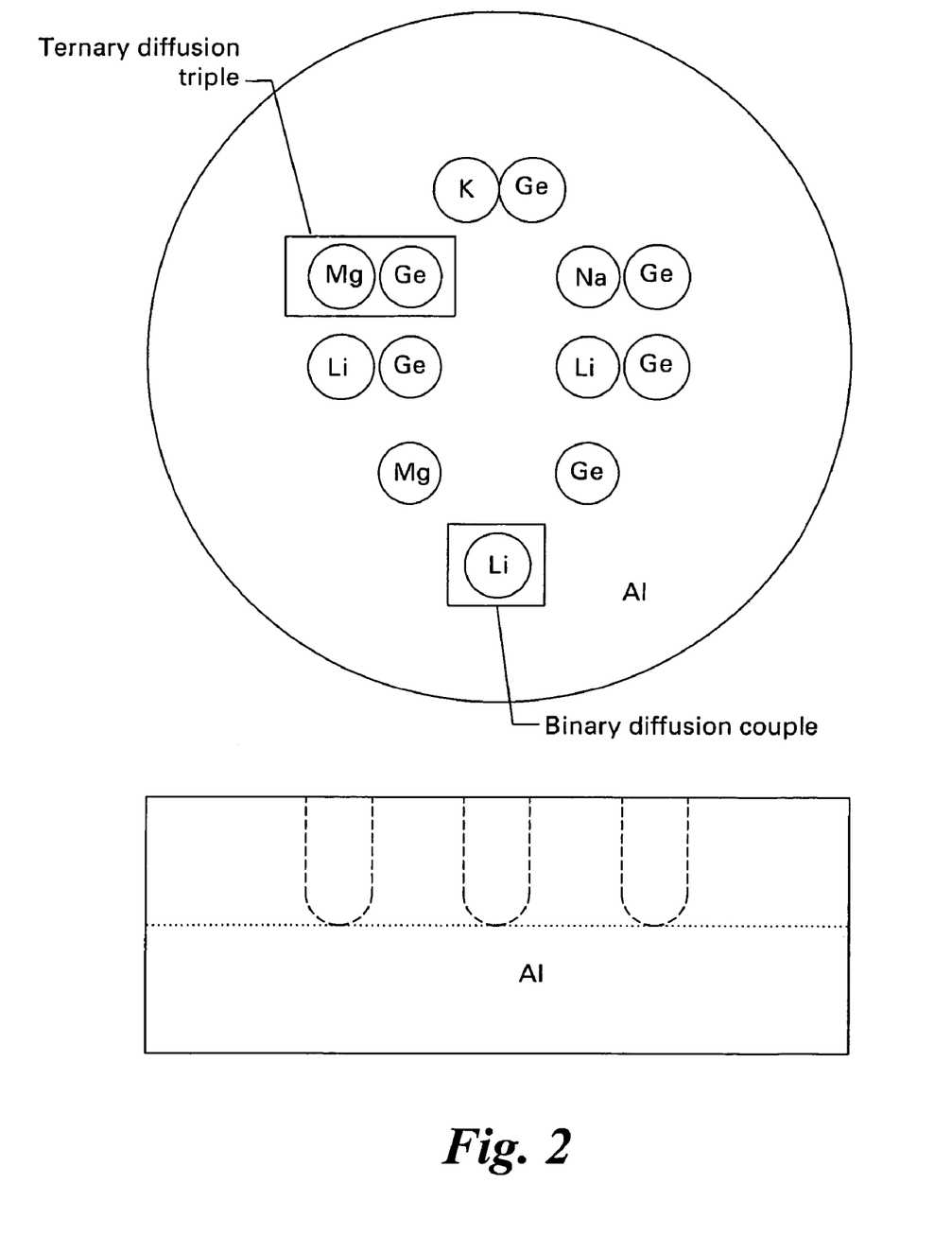
FIG. 2 is a schematic showing the arrangement of diffusion multiples in an aluminum substrate.

In an exemplary embodiment, in one manner of proceeding, a diffusion multiple assembly comprises an aluminum substrate as shown in FIG. 2. The aluminum substrate is used to prepare a combinatorial library from alkali metals and/or alkaline earth metals. In other words, the alkali metals and/or the alkaline earth metals are placed in the holes in the substrate to form the diffusion multiples. The substrate has a diameter of 2.0 inches and the holes containing the reactants are drilled to a depth of 0.5 inch. The reactants selected for placement in the holes in the substrate are potassium (K), lithium (Li), sodium (Na), magnesium (Mg) and germanium (Ge). While the sodium and potassium do not form aluminides by themselves, they can be used to form ternary aluminides by combining them with either of lithium, magnesium and germanium. As may be seen from the FIG. 2, the reactants magnesium, lithium and germanium are placed into individual holes in the substrate. Binary diffusion couples of the reactants with aluminum may be prepared by putting the individual elements such as magnesium, lithium and germanium into holes that are spaced apart from one another in the aluminum block.

Ternary diffusion triples of the reactants may also prepared by drilling holes in close proximity to each other as may be seen in FIG. 2. The ternary triples comprise lithium and magnesium with aluminum, lithium and germanium with aluminum, sodium and germanium with aluminum, magnesium and germanium with aluminum, and germanium and potassium with aluminum.

As stated above, the light-elements (alkali metals and/or alkaline earth metals) such as lithium, magnesium, sodium, potassium, and germanium are put into the holes in the aluminum block. This operation is carried out in a well-controlled environment such as a glove box filled with pure argon to prevent the light-elements from oxidation. The amount of light-elements in each hole is usually less than a quarter of the volume of the hole such that there will be no pure light elements left after the interdiffusion/heat treatment step. The aluminum block with the light-elements in the holes are then transferred to a furnace or a reactor. The furnace or reactor is in either vacuum or a protective environment such as argon. The block is then heated to an elevated temperature to allow significant interdiffusion to take place among the elements in the holes and the aluminum substrate.

The block is preferably heat treated from a temperature of about 400 to about 600° C. to permit the melting of the reactants or their eutectic compositions. The heat treatment is generally conducted in a convection furnace. The heat treatment to form the diffusion couple/multiple may also include using radiant heating and/or conductive heating if desired. The melted reactants diffuse and react with the aluminum substrate to form aluminides, germanides, doped phases, and solid-solution compositions. Within the aforementioned temperature range, a temperature of greater than or equal to about 410, preferably greater than or equal to about 420, and more preferably greater than or equal to about 425° C. may be used. Also desirable within this temperature range, are temperatures of less than or equal to about 575, preferably less than or equal to about 525, and more preferably less than or equal to about 500° C. An exemplary temperature is 450° C.

The time period of the heat treatment of the diffusion multiple assembly is about 5 to about 100 hours. Within this range, it is generally desirable to heat treat the diffusion multiple assembly for greater than or equal to about 10, preferably greater than or equal to about 15, and more preferably greater than or equal to about 17 hours. Also desirable within this range is a time period of less than or equal to about 75, preferably less than or equal to about 50 and more preferably less than or equal to about 40 hours. An exemplary time period of heat treatment at a temperature of 450° C. is about 24 hours.

Figure 3A:
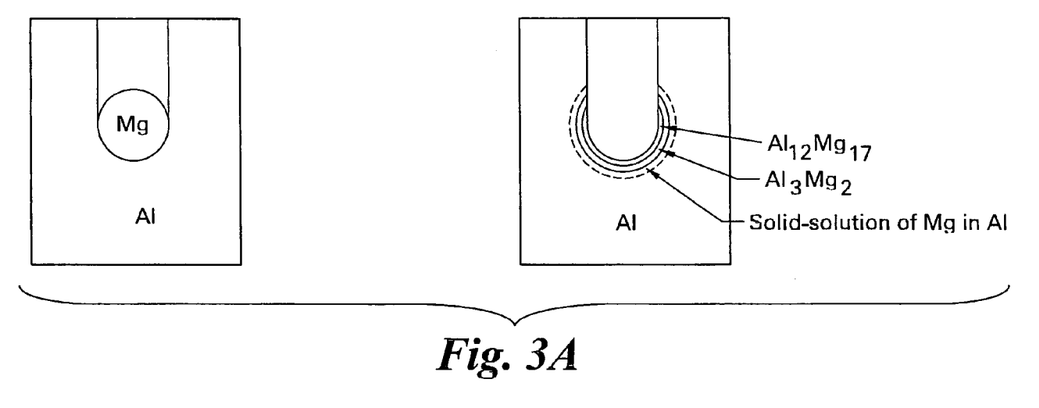
FIG. 3 is a schematic showing (a) the formation of a binary couple of magnesium and aluminum and (b) the formation of ternary diffusion triple of magnesium, lithium and aluminum.
Figure 3B:
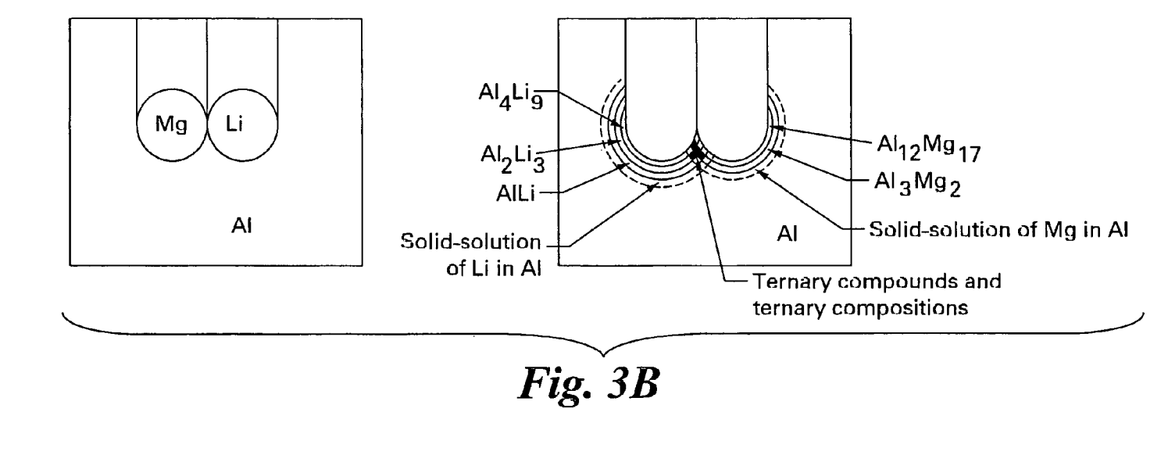

An embodiment exemplifying the formation of a diffusion couple or triple is depicted in the FIG. 3. FIG. 3(a) shows the formation of a diffusion couple in an aluminum substrate. In FIG. 3(a), magnesium is used as the reactant to produce a binary diffusion couple. The block is heated to 450° C., for a period of 24 hours to permit interdiffusion to take place between the aluminum substrate and the magnesium reactant. Although the melting point of magnesium is about 650° C., the interaction of magnesium with aluminum produces an eutectic composition with a melting point of 437° C. The melted elements diffuse and react with each other to form aluminides of various compositions as exemplified by the FIG. 3. In the figure it may be seen that the aluminides formed further away from the boundaries of the original hole in the aluminum substrate have a greater proportion of aluminum when compared with the proportion of magnesium. In a similar manner, FIG. 3(b) shows the formation of a diffusion triple involving the use of magnesium and lithium as reactants in an aluminum substrate. The block is heated to about 450° C. for 24 hours. A number of different binary aluminides are formed at the interface of the lithium or the magnesium with the aluminum. Examples of these aluminides formed at the interface of lithium with aluminum are AlLi, $Al_2Li_3$, or $Al_4Li_9$, while examples of aluminides formed at the interface of magnesium with aluminum are $Al_3Mg_2$ and $Al_{12}Mg_{17}$. A number of different ternary compositions comprising aluminum, lithium and magnesium are formed at the interface between the aluminum, magnesium and lithium.

Figure 4:
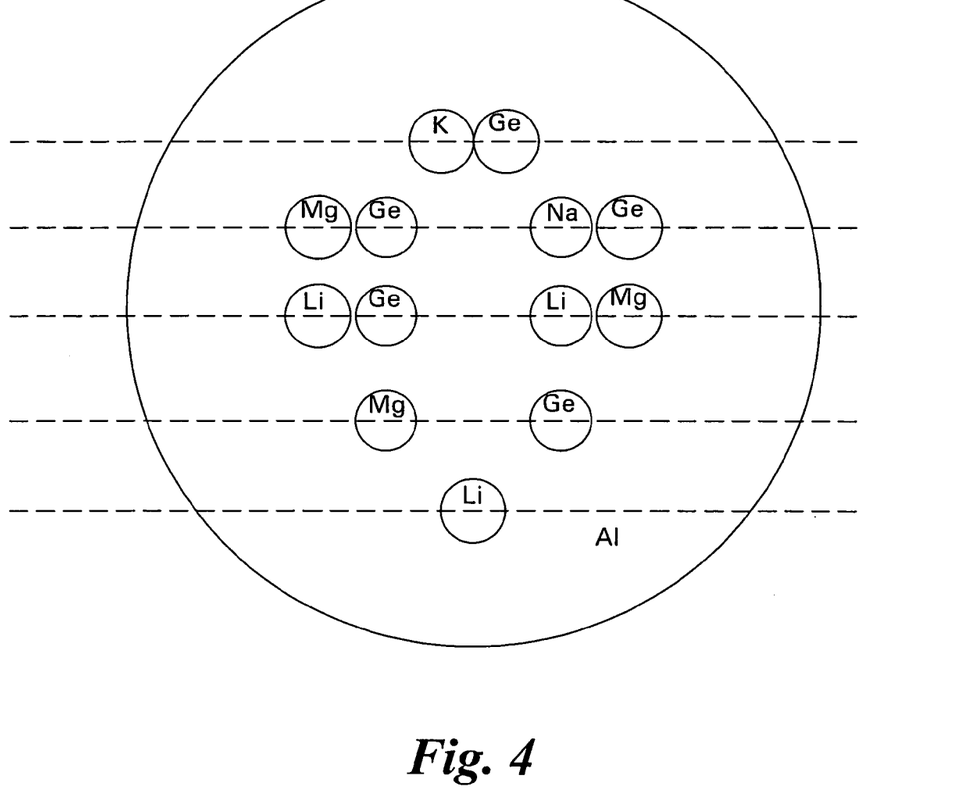
FIG. 4 is a schematic showing how the diffusion multiple is sliced for purposes of analysis.

After the heat treatment to form the diffusion multiple, a slicing operation may be performed on the diffusion multiple assembly. The slicing step is designed to expose different compounds/solid solutions formed at different locations of the diffusion multiple assembly as shown in FIG. 4. The slicing operation is generally performed using mechanical cutting using a saw or wire discharge electro-machining (EDM). Following slicing, the respective slices may be optionally subjected to grinding and polishing if desired. Following the optional grinding and polishing operation, the samples are subjected to electron microprobe analysis and electron backscatter diffraction (EBSD) analysis to identify the phases and compounds prior to being tested for the ability of the light metal aluminide for hydrogenation.

After the electron microprobe and EBSD analysis of the light metal aluminides, germanides and solid solutions, the resulting compositions in the diffusion multiple may be converted to hydrides by exposure to hydrogen or upon hydrogenation.

The following aluminides and germanides can be obtained from the diffusion multiple assembly shown in FIG. 2 and may be used for a determination of hydrogen potential: AlLi, $Al_2Li_3$, $Al_4Li_9$, $Al_3Mg_2$, $Al_{12}Mg_{17}$, $Ge_4K$, GeK, $GeK_3$, $GeLi_3$, $Ge_5Li_{22}$, $Mg_2Ge$, $Ge_4Na$, GeNa, $GeNa_3$, or the like, or a combination comprising at least one of the foregoing aluminides and germanides. The above mentioned germanides may also be doped with aluminum if desired.

The aluminides and germanides generally have at least one of either potassium, lithium, magnesium or sodium. The presence of the potassium, lithium magnesium and sodium promotes an affinity for hydrogen. Aluminum and germanium on the other hand have a low affinity for the hydrogen and this feature is offset by the affinity of hydrogen displayed by potassium, lithium, magnesium and/or sodium. Without being limited to theory it is believed that those elements of the diffusion multiple that have a high affinity for hydrogen generally facilitate absorption of hydrogen, while those elements such as aluminum and germanium that have a low affinity for hydrogen generally facilitate the desorption.

The diffusion multiple comprising the light metal aluminides and germanides can generally be tested for their ability to absorb and desorb hydrogen. The composition gradients formed during the preparation of a diffusion multiple can serve as a combinatorial library to determine which specific composition can absorb and desorb hydrogen.

The ability of a light metal compound in a diffusion multiple to reversibly absorb and desorb hydrogen may be detected by a variety of analytical techniques. In general, the process of absorption of hydrogen into the aluminides and germanides results in a change in appearance because of a crystal structure change and/or a volumetric expansion. In addition, the absorption of hydrogen into the aluminides and germanides is generally accompanied by an exotherm, while the desorption of the hydrogen is generally accomplished by the application of heat. The analytical techniques that can be used to measure the changes in the diffusion multiples are time of flight secondary mass ion spectrometry (ToF-SIMS), tungsten oxide ($WO_3$) coatings and thermography. In addition, the aluminides and the germanides can be screened by observing the diffusion multiple after hydrogenation, since the phases that do undergo hydrogenation (i.e., hydrides) generally become pulverized.

The ToF-SIMS has the capability to detect the absorption and desorption of all elements including hydrogen, which makes it useful for the determining those compositions present in the light metal diffusion multiple that can readily be used for the storage of hydrogen. This technique can operate at temperatures of about −100 to about 600° C., has a high sensitivity to hydrogen and is therefore a useful tool for investigating the combinatorial libraries generated by the diffusion multiples. The ToF-SIMS can therefore be effectively used to map the absorption temperatures and the reaction conditions during the hydrogenation process.

The tungsten oxide ($WO_3$) generally changes its color when it reacts with hydrogen. In order to use the tungsten oxide as a detector for the hydrogen uptake in the various compositions of the diffusion multiple, the diffusion multiple is coated with $WO_3$ after the hydrogenation reaction. When the diffusion multiple is heated up to release the hydrogen, the $WO_3$ changes color as the hydrogen desorbs from the diffusion multiple.

Thermography or thermal imaging (infrared imaging) may also be used to determine the absorption and desorption of hydrogen. When a phase in the diffusion multiple absorbs hydrogen, the local temperature rises, while when the phase desorbs hydrogen, the local temperature decreases. Thermography can therefore be used to image the compounds that absorb or desorb hydrogen.

In one embodiment, the aluminides and germanides can be hydrogenated by subjecting them to a mixture of gases comprising hydrogen. As stated above, the aluminides or germanides generally release heat during the absorption of hydrogen. The hydrogen may then be released by reducing the pressure and supplying heat to the hydrogenated aluminides and germanides. The desorption of hydrogen often requires thermal cycles. Such thermal cycles can be obtained by the application of electromagnetic fields or by passing electrical current through the material of interest. This can be accomplished because most hydrogenated aluminides and germanides are electrically conductive. The resistance of these materials changes with the extent of hydrogen storage.

In one embodiment, the desorption of stored hydrogen can be facilitated by the use of electromagnetic fields. Microwave energy can be directly applied to the hydrogenated aluminide or germanide or to a suitable medium such as water, alcohols, or the like, intermixed with the hydrogenated aluminide or germanide to allow for the local release of hydrogen under controlled conditions, without heating the whole system. This method provides a high efficiency of desorption, which generally occurs at temperatures lower than those achieved due to heating brought about by conduction and/or convection. This phenomena occurs due to a local excitation of the bonds in the aluminide or germanide by the microwaves. The desorption may be conducted by two different methods. The first of these methods comprises using microwaves to achieve a release of the entire hydrogen content. The second method comprises using a microwave treatment just to initialize the desorption process which then can be continued by either conductive and/or convective heating at lower temperatures and in a much easier manner than when heated by only conductive and/or convective heat from the start of the process.

In yet another embodiment, hydrogen desorption can be induced by the heat generated by an electrical resistor embedded in the aluminides or germanides. The energy of the current flowing into the resistor is converted into heat by the Joule effect. The amount of heat created locally by the current flow is particularly high in the case of a compressed powdered aluminide or germanide material, with hot spots occurring on the current paths between powder particles, where the resistivity is very high. In extreme cases, powder welding may occur at the hot spots. Therefore, the current parameters should be adjusted properly to avoid sintering or powder welding. Depending on the conditions of the process, the aluminides and germanides may be heated directly, or by the use of multiple resistors as detailed above.

In yet another embodiment, hydrogen absorption and desorption is accomplished by mixing fine particles of the aluminides or germanides with an appropriate amount of another chemical composition that has a higher thermal conductivity to conduct heat faster to the hydrogenated compound for hydrogen release. In yet another embodiment, hydrogen desorption is accomplished by using the exhaust heat released from the proton exchange membrane (PEM) fuel cells to heat up the hydrogenated aluminides and germanides.

In yet another embodiment, dopants comprising titanium, vanadium zirconium, yttrium, lanthanum, nickel, manganese, cobalt, silicon, gallium, germanium, and the elements from the lanthanide series may be added to catalyze the desorption of hydrogen. The dopant may be added in an amount of up to about 20 wt %, of the total hydrogen storage composition prior to the storage of hydrogen. It is generally desirable to add the dopant in an amount of less than or equal to about 15, preferably less than or equal to about 10 and more preferably less than or equal to about 5 wt % of the total weight of the hydrogen storage composition (i.e., the diffusion multiple) prior to the storage of hydrogen.

The hydrogen desorbed from these aluminides and germanides can be about 1 to about 8 wt %, with amounts of greater than or equal to about 4 wt % preferred, amounts of greater than or equal to about 5 wt % more preferred, and amounts of greater than or equal to about 6 wt % even more preferred.

As stated above, the combinatorial method of determining the capability of light metal aluminides and germanides to absorb and desorb hydrogen is quick and efficient. The light metal aluminides and germanides that are determined to absorb and desorb hydrogen may be utilized in fuel cells, gas turbines, and the like for the storage of energy.

Figure 5:
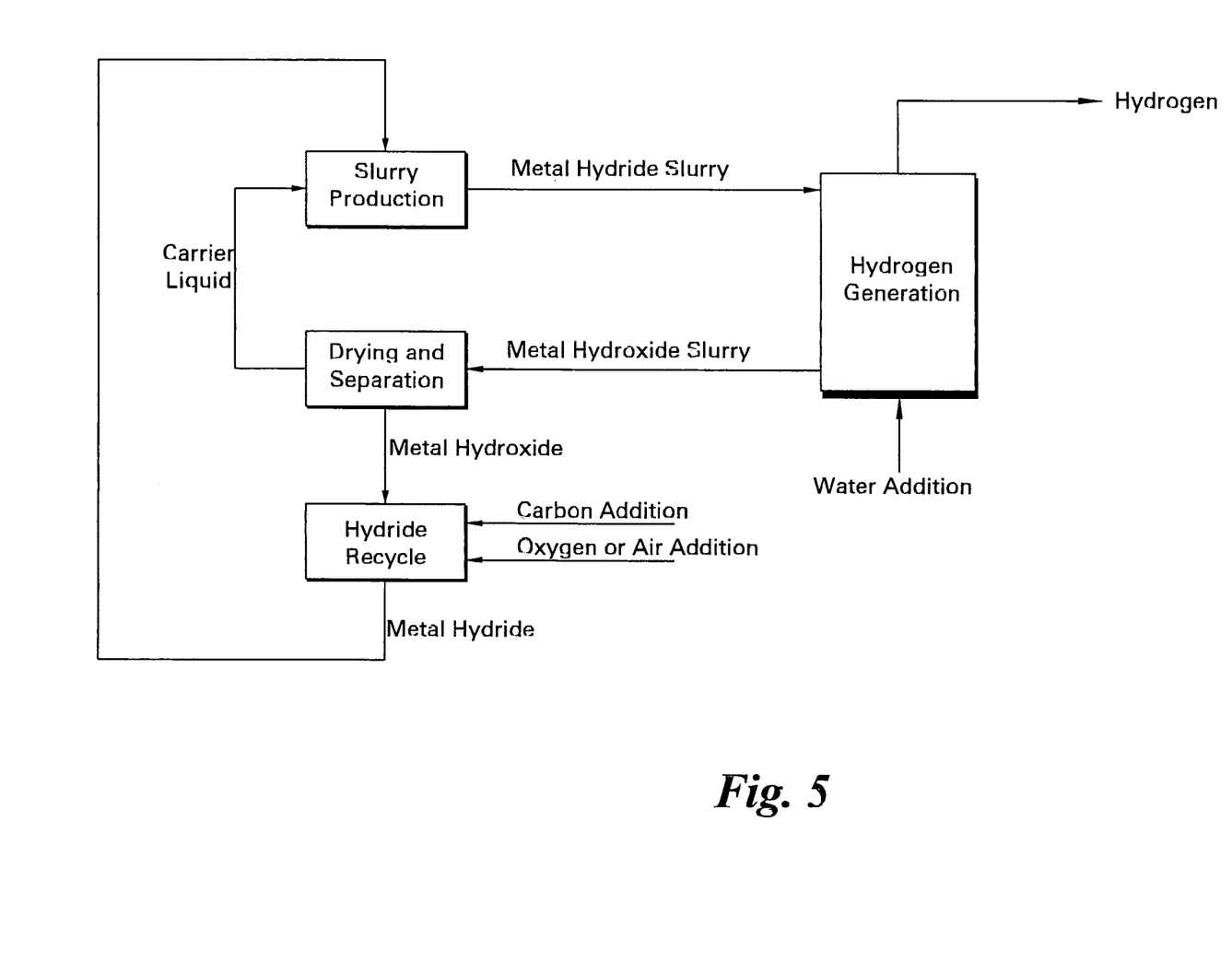
FIG. 5 is a schematic showing a system for the generation of hydrogen from the hydrides of light metal aluminides and germanides.

In one exemplary method of producing and storing hydrogen from hydrides of the light metal aluminides and germanides, a system shown in FIG. 5 comprises an optional slurry production reactor in upstream of and in fluid communication with a hydrogen generation reactor. The slurry production reactor regenerates a metal hydride slurry that is utilized to produce hydrogen in the hydrogen generation reactor. At least a portion of the metal hydride in the hydrogen generation reactor is oxidized to a metal hydroxide during the recovery of hydrogen from the light metal hydrides. The hydrogen generation reactor utilizes electromagnetic radiation, convectional heating, PEM fuel cell exhaust, and the like to heat the hydride for the generation of hydrogen. The hydrogen generation reactor is also upstream of and in fluid communication with an optional drying and separation reactor and the metal hydroxide is transferred to the drying and separation reactor. At least a portion of metal hydroxide generated in the hydrogen generation reactor is recycled to the drying and separation unit. The hydrogen generation reactor is optionally supplied with water. The optional drying and separation reactor separates any reusable fluids such as water from the metal hydroxides and recycles the fluid to the optional slurry production reactor. The system also comprises a hydride recycle reactor in fluid communication with and downstream of the drying and separation unit. Dry metal hydroxide from the drying and separation reactor is regenerated into a metal hydride in the hydride recycle reactor by contacting it with a mixture of gases comprising hydrogen. The hydride recycle reactor is supplied with carbon and oxygen in amounts effective to regenerate the metal hydride. The regenerated metal hydride is then recycled to the slurry production reactor for mixing with the recycled carrier liquids.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of recovering hydrogen comprising:
   contacting at least one compound in hydrogen to form a nitrogen-free hydrogenated compound; wherein the compound is $Ge_4K$, $GeK$, $GeK_3$, $Ge_4Na$, $GeNa$, $GeNa_3$, or a combination comprising at least one of the foregoing compounds; and
   heating the hydrogenated compound to recover the hydrogen.

2. The method or claim 1, wherein the heating is conducted using microwave radiation, convectional heating, or a combination comprising at least one of the foregoing methods of heating.

3. The method oF claim 1, further adding a dopant comprising titanium, vanadium zirconium, yttrium, lanthanum, nickel, manganese, cobalt, silicon, gallium, germanium, and the elements from the lanthanide series to the compound in an amount of less than or equal to about 20 wt % of the compound.

4. The method of claim 1, wherein the heating is effected by the heat from the exhaust of a fuel cell.

* * * * *